US005742061A

United States Patent [19]

Lemonnier et al.

[11] Patent Number: 5,742,061

[45] Date of Patent: Apr. 21, 1998

[54] IONIZING RADIATION DETECTOR HAVING PROPORTIONAL MICROCOUNTERS

[75] Inventors: Marc Lemonnier, Les Ulis; Thierry Claude Bucaille, Paris; Joël Robert Charlet, Verrieres le Buisson; Michel Bordessoule, Les Ulis; François Bartol, Bures sur Yvette; Stephan Megtert, Villebon sur Yvette, all of France

[73] Assignee: Centre National de la Recherche Scientifique, Paris, France

[21] Appl. No.: 676,222

[22] PCT Filed: Nov. 23, 1995

[86] PCT No.: PCT/FR95/01548

§ 371 Date: Aug. 19, 1996

§ 102(e) Date: Aug. 19, 1996

[87] PCT Pub. No.: WO96/17373

PCT Pub. Date: Jun. 6, 1996

[30] Foreign Application Priority Data

Nov. 25, 1994 [FR] France .................................. 94 14158

[51] Int. Cl.$^6$ .............................. H01J 47/06; G01T 1/18

[52] U.S. Cl. .......................................... 250/385.1; 250/374

[58] Field of Search ................................ 250/374, 385.1, 250/385.2

[56] References Cited

U.S. PATENT DOCUMENTS

| | | | |
|---|---|---|---|
| 3,930,162 | 12/1975 | Reiss | 250/385.1 |
| 4,264,816 | 4/1981 | Walenta | 250/385.1 X |
| 4,686,369 | 8/1987 | McDaniel et al. | 250/385.1 |
| 4,965,861 | 10/1990 | Filthuth | 250/374 X |
| 5,569,699 | 10/1996 | Barthe et al. | 250/374 X |
| 5,614,722 | 3/1997 | Solberg et al. | 250/385.1 X |

FOREIGN PATENT DOCUMENTS

| | | | |
|---|---|---|---|
| 99300 | 1/1984 | European Pat. Off. . | |
| 599619 | 10/1979 | U.S.S.R. | 250/385.1 |
| 87/07430 | 12/1987 | WIPO . | |

OTHER PUBLICATIONS van Beek et al., "A Position Sensitive Detector System Consisting of an Array of Mini–Proportional Counters", IEEE Transactions on Nuclear Science, vol. NS–31, No. 1, Feb. 1984.

*Primary Examiner*—Edward J. Glick
*Attorney, Agent, or Firm*—Oblon, Spivak, McClelland, Maier & Neustadt, P.C.

[57] ABSTRACT

An ionizing radiation detector having an enclosure filled with a rare gas within which is located a proportional counter. An absorption zone is formed between the counter and the upper wall of the enclosure in which radiation is ionized. The counter has at least one anode and at least one cathode which are parallel to one another and separated by an insulating material layer. The cathode and the insulating material layer have at least one opening in which there is a substantially uniform electric field and which constitutes a multiplication zone for electrons which result from the ionization of the radiation.

20 Claims, 5 Drawing Sheets

FIG. 6
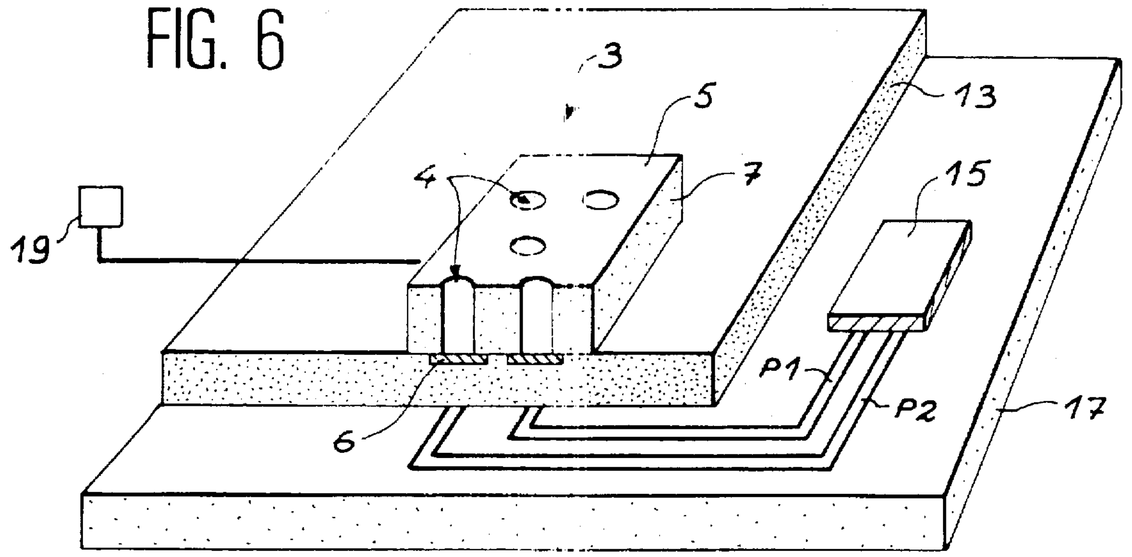
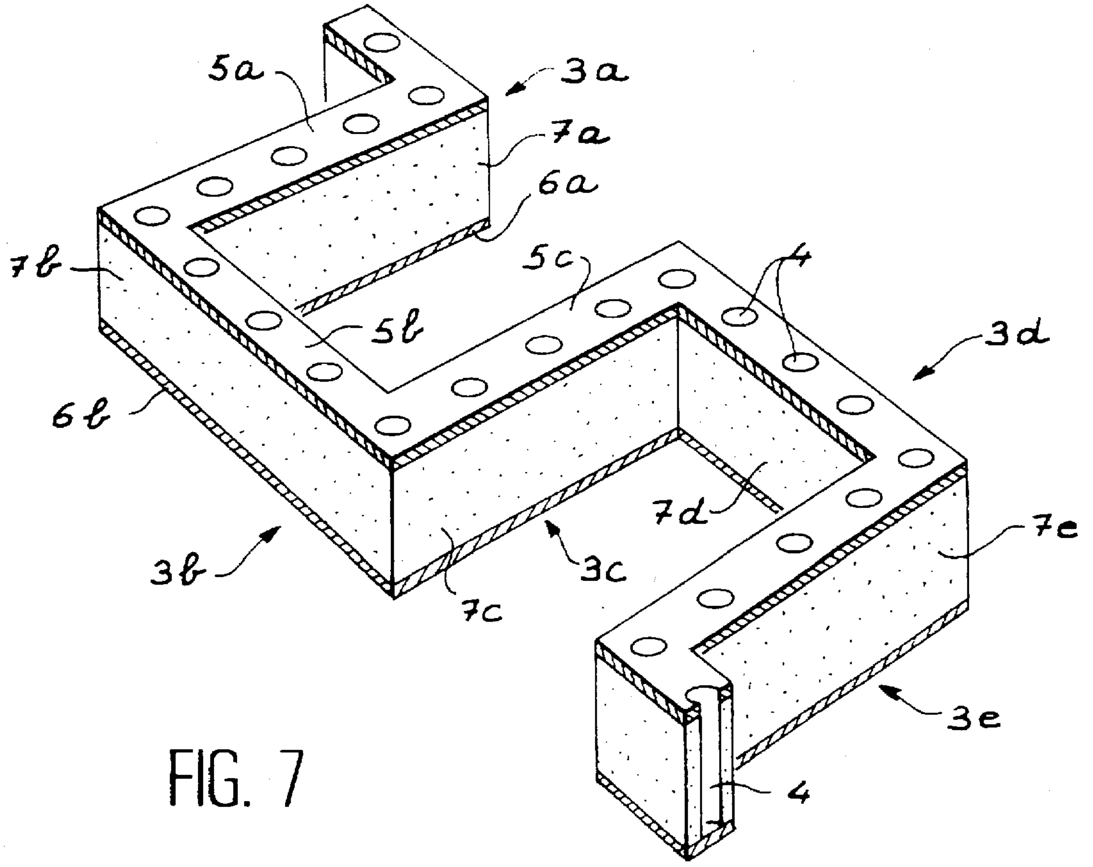
FIG. 7

IONIZING RADIATION DETECTOR HAVING PROPORTIONAL MICROCOUNTERS

BACKGROUND OF THE INVENTION

1. Field of the Invention

The present invention relates to a gas detector making it possible to detect ionizing radiation, such as α, β, γ, x or ultraviolet radiation from a plurality of proportional microcounters assembled so as to form a proportional counter.

Such a detector has numerous applications in the fields of medical imaging, biology, particle physics or crystallography and in numerous fields requiring nondestructive testing.

2. Discussion of the Background

The detector according to the invention is of the type in which the primary electrons resulting from the ionization of radiation by the gas are multiplied under the effect of a high local intensity electric field in a gas. Several types of such gas detectors are at present known and used by the expert.

The most widely known of such detectors is the parallel plate detector. It has a counter obtained by means of two parallel grids spaced from one another by a few millimeters and between which the electrons are multiplied. This zone located between the two parallel grids is called the "multiplication zone". Thus, the multiplication zone of such a detector is in the form of a single volume defined by the two grids. Due to the fact that it constitutes a single volume of a relatively large size, such a counter suffers from the disadvantage of being very breakdown sensitive. Moreover, the counters of such parallel plate detectors can only have a limited spatial resolution and due to the plate/grid thickness cannot be arranged in such a way as to form detectors having varied shapes.

Another type of gas detector is the wire detector, which has a plurality of equidistant wires held taut in one plane. On either side of said plane are placed two taut grids forming cathodes. Electron multiplication takes place in the vicinity of the wires, because at this location there is a high electric field. However, the multiplication zone of such a detector cannot be isotropic. It also does not permit the detector to have varied shapes.

A further, more recent gas detector type is the microstrip detector. In the microstrip detector, the counter consists of coplanar electrodes etched on an insulating support. Such a microstrip detector is described in French patent FR-A-2 602 058. The major disadvantage of this detector is its relatively low gain limited essentially to 5,000, because it does not permit the superimposing of several counters. In addition, like the counters of parallel plate detectors described hereinbefore, the counters of these microstrip detectors have anisotropic multiplication zones localized on very thin tracks (approximately 10 μm), which makes them very sensitive to breakdown. These detectors also suffer from the disadvantage of being relatively fragile.

SUMMARY OF THE INVENTION

The object of the invention is to obviate the disadvantages of the aforementioned detectors. To this end, it proposes a gas detector incorporating a counter constituted by a plurality of independent, proportional microcounters.

More specifically, the invention relates to an ionizing radiation detector having an enclosure filled with a gaseous mixture and which can e.g. incorporate a rare gas and within which is placed a proportional counter defining between itself and the upper wall of the enclosure, a zone in which the ionization of the gas takes place by radiation absorption.

This proportional counter also has at least one lower electrode and at least one upper electrode, which are parallel to one another and separated from one another by an insulating material layer and are raised to different potentials. The upper electrode and the insulating material layer have at least one opening in which there is a substantially uniform electric field and constituting a multiplication zone for the electrons resulting from radiation ionization.

Each portion of the counter incorporating an upper electrode portion and an insulating layer portion, which are perforated, as well as a lower electrode portion constitutes an independent microcounter, also known as a unit cell.

Advantageously the lower electrode is an anode and the upper electrode a cathode.

According to the invention, the insulating material is a rigid material which can either be photosensitive, which facilitates the manufacture of the detector, or highly resistive (with a resistivity of $10^9$ to $10^{13}\Omega$.cm), or fluorescent, which makes it possible to transform the UV radiation resulting from multiplication into visible radiation.

According to a first embodiment of the invention, the proportional counter has a plurality of juxtaposed, upper electrodes in a plane parallel to the lower electrode and separated from one another by an insulating material layer, the openings of each upper electrode being aligned with the openings of the insulating material layers.

According to another embodiment of the invention, the proportional counter has a plurality of upper electrodes arranged in the same first plane, with a first direction and interconnected and a plurality of lower electrodes arranged in the same second plane, parallel to the first plane, in a same second direction and interconnected.

According to another embodiment of the invention, the proportional counter is cylindrical overall, the lower and upper electrodes forming an open cylinder longitudinally traversed by an electric power supply wire.

According to yet another embodiment of the invention, the upper electrode and lower electrode are independent and each is connected to an input of an electronic processing circuit for forming a pixel detector.

BRIEF DESCRIPTION OF THE DRAWINGS

FIG. 6 shows a microcounter plate on which each microcounter is connected by its anode to external circuitry.

FIG. 7 is an example of an arrangement of several strips of proportional microcounters.

DETAILED DESCRIPTION OF EMBODIMENTS

Figure 1A:
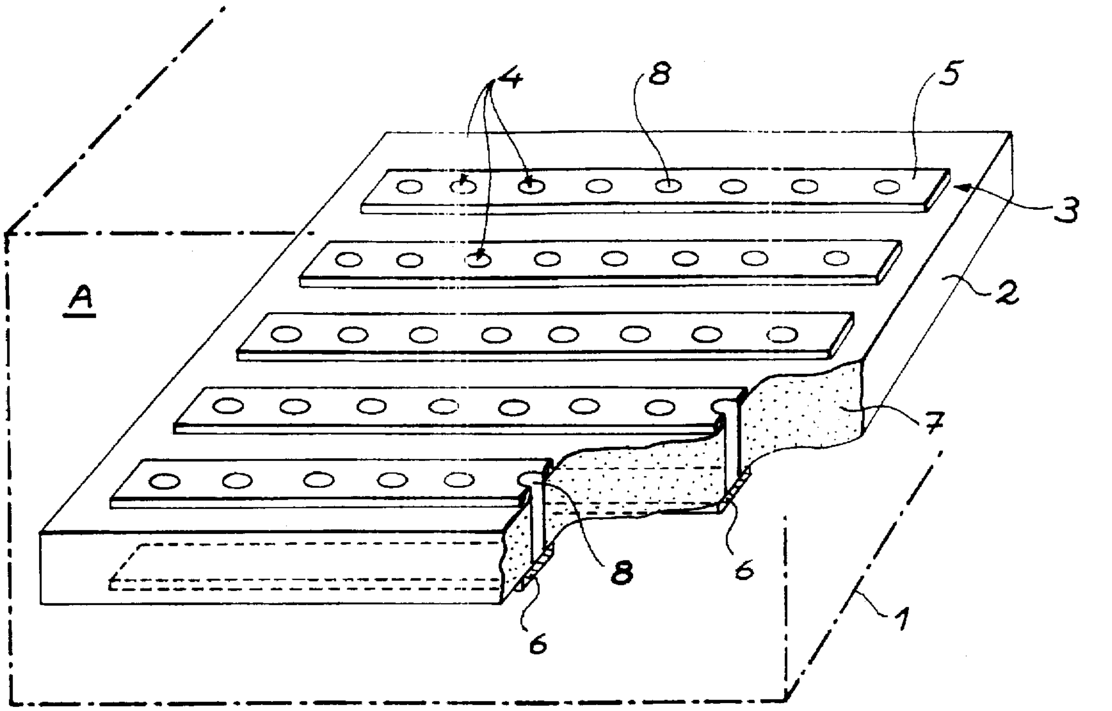
FIG. 1A is a perspective view of a detector according to the invention having a proportional counter implemented according to a first embodiment.

FIG. 1A diagrammatically shows a gas detector according to the invention. This detector has an enclosure shown in mixed line form in the drawing. This enclosure 1 is filled with a gaseous mixture generally incorporating a rare gas (such as argon, krypton, xenon, etc.) and which is subject to a chosen pressure. This gaseous mixture ensures the absorption of the radiation received by the detector. Thus, said radiation is ionized by the gas in a so-called "absorption zone", in which a weak, uniform electric field prevails. This radiation ionization creates electric charges which are to be multiplied by means of the proportional counter 2.

This proportional counter 2 has a plurality of microcounters, also known as "unit cells" 4. Each of these microcounters 4 is produced by means of two electrodes located in different planes and raised to different potentials so as to create an electric field, which attracts electric charges resulting from the ionization of the radiation in the gas.

As can be seen in FIG. 1A, the microcounters are arranged in the form of strips 3. FIG. 1A and the subsequently described drawings show microcounters arranged in strip or row form. However, it is clear that these microcounters can be arranged in a random geometry form (e.g. in squares), but can also be independent. The choice of a strip representation was solely to facilitate the understanding of the drawings.

On referring to FIG. 1A, each microcounter strip 3 comprises an upper electrode 5 or cathode, a lower electrode 6 or anode, and an insulating material layer 7 between the two electrodes 5 and 6. The cathode 5 and insulating layer 7 have holes or openings 8 issuing onto the anode 6. Each opening 8 constitutes a multiplication zone. Thus, each microcounter has a cathode portion 5, an insulating layer portion 7, an anode portion 6 and a multiplication zone 8.

Although each band or strip 3 can have several openings 8, each microcounter 4 is independent, because it has its own multiplication zone.

Thus, a counter 2 according to the invention can have a plurality of multiplication zones, which greatly reduces breakdown risks.

FIG. 1A shows a "model" of the counter 2 revealing the two openings 8 belonging to the microcounter strips 3 and issuing onto the respective anodes 6.

Figure 1B:
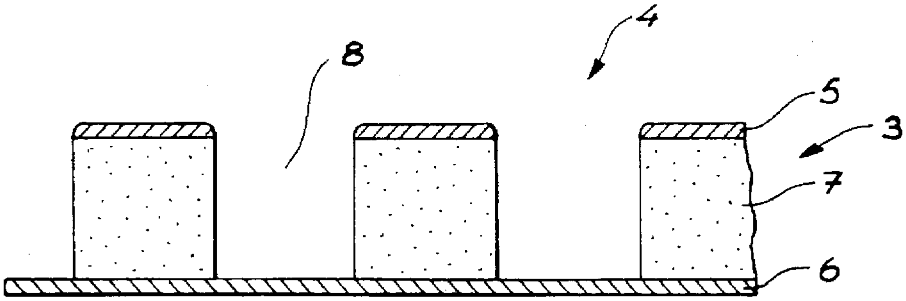
FIG. 1B shows a front view of a microcounter strip according to the embodiment of FIG. 1A.

FIG. 1B shows in greater detail a strip 3 of microcounters. As explained hereinbefore, each strip 3 has an upper electrode 5 and a lower electrode 6. The upper electrode 5 is a cathode and the lower electrode 6 an anode. The cathode 5 and anode 6 are separated from one another by an insulating material layer 7.

According to an embodiment, said insulating material is also photosensitive, which facilitates detector manufacture.

According to another embodiment, the insulating material is also highly resistive. According to yet another embodiment, the insulating material is fluorescent, so as to transform the UV radiation due to the multiplication into visible radiation, which can e.g. be counted.

The cathode 5, as well as the insulating layer 7 are perforated with holes 8 within which prevails an electric field, which creates multiplication zones. In these multiplication zones 8, the electric field is intense and quasiuniform. It is therefore naturally towards these multiplication zones that the electric charges created by the ionization of radiation in the absorption zone pass.

From the electrical standpoint, if the potential of the entrance window of the detector (i.e. the enclosure) is zero volt, the cathode can be raised to a few hundred volts, so as to attract the primary charges and the anode is raised to an even higher voltage, so as to ensure the multiplication of these primary charges.

Moreover, for certain applications, it is possible to use as the insulating material, in each microcounter strip, a substrate, such as a ceramic substrate in order to ensure a better stability of the counter.

Figure 2A:
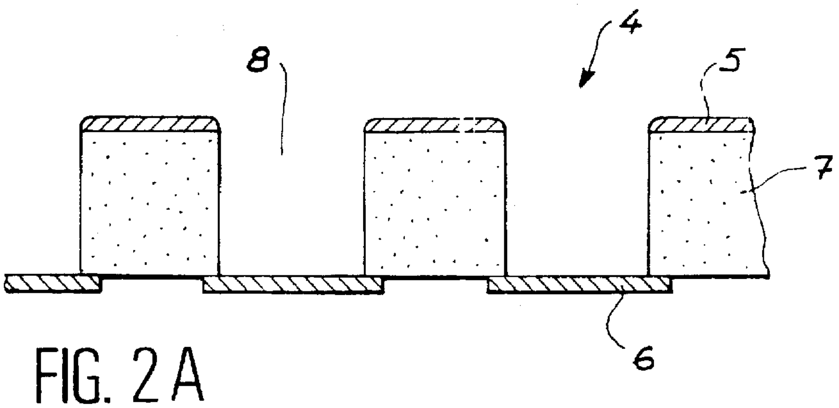
FIG. 2A is a front view of a microcounter strip according to a second embodiment of the invention.

FIG. 2A shows in section microcounters 4 produced according to an embodiment different from that shown in FIG. 1B. In this embodiment, the cathodes and anodes are positioned in two perpendicular directions, the cathodes 5 being arranged in lines and the anodes 6 in rows. Each opening 8 issues onto an anode 6, as in the previous embodiment.

Figure 2B:
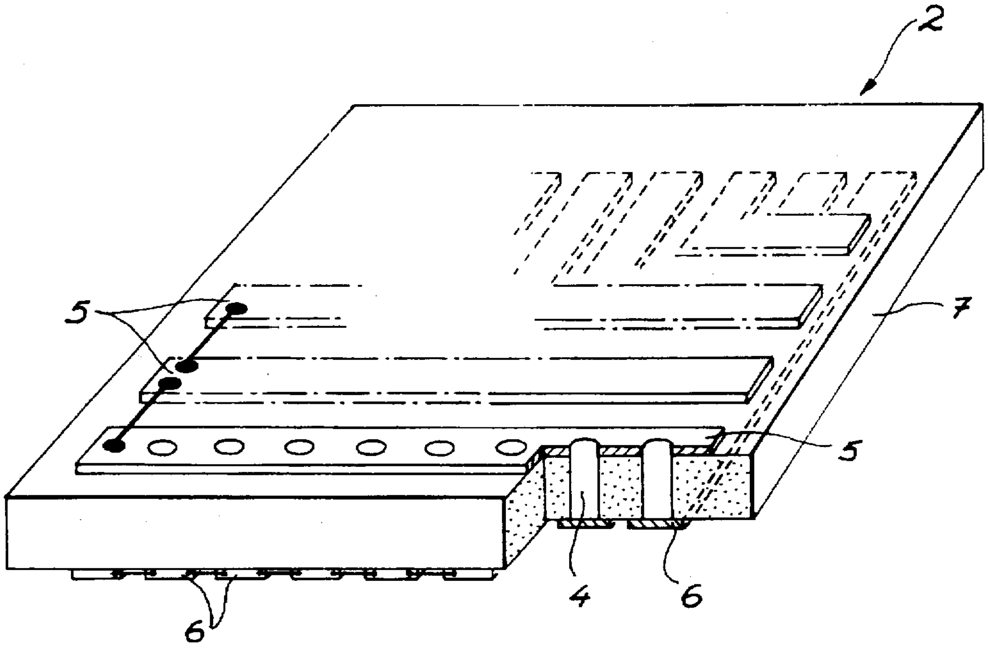
FIG. 2B is a perspective view of a counter implemented with several strips of microcounters of FIG. 2A.

FIG. 2B shows a proportional counter 2 produced by means of a plurality of interconnected microcounter strips of the type shown in FIG. 2A. In other words, the proportional counter 2 of FIG. 2B has a plurality of cathodes 5 arranged in rows and a plurality of anodes 6 arranged in columns. As in the preceding drawings, the cathodes 5 are separated from the anodes 6 by a rigid, photosensitive, insulating material layer 7. The cathodes 5 and insulating material layer 7 are perforated by openings 8, which issue onto the anodes 6 and as shown in FIG. 2B.

Such an arrangement of the electrodes 5 and 6 makes it possible to code events in two directions and can consequently be used e.g. in imaging.

As for all the proportional counters shown in the preceding drawings, the openings 8 of the microcounters 4 are shown in FIG. 2B as holes having a round section. However, it is clear that all these microcounters can have openings or recesses 8 with different shapes. For example, said recesses can be slots, which are parallel or non-parallel to one another, can also be conical, cylindrical, etc. and of variable size.

Figure 3A:
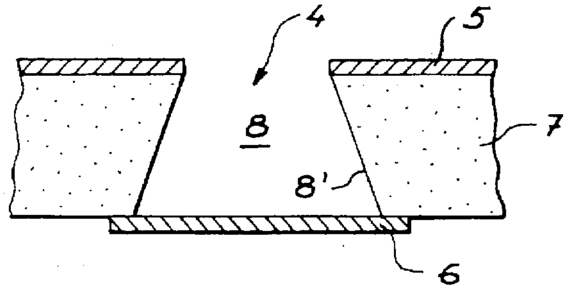
FIGS. 3A and 3B show in section two microcounters, whose recesses are respectively conical and concave.
Figure 3B:
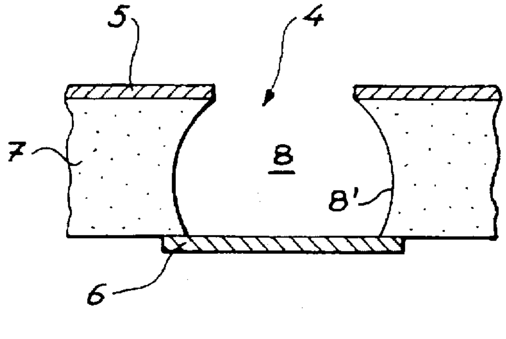

FIGS. 3A and 3B show two examples of such recesses. In FIG. 3A the recess 8 is conical, which illustrates the advantage of avoiding the ions from the multiplication adhering to the recess wall 8', i.e. to the material 7. In FIG. 3B the recess 8 of the microcounter has a concave wall 8', whose advantage is similar to that of the recess of FIG. 3A.

However, whatever the shape of these recesses, the ratio between the solid portion of a microcounter and the recessed portion thereof is typically chosen between 1 and 10.

According to the preferred embodiment of the invention (cf. FIGS. 1A to 2B), the recesses are circular holes, whose ratio between the depth of the hole and the width of the hole generally varies between 3 and ½.

In the case of openings 8 having appropriate shapes and sizes, the light emitted during multiplication can be collected to form images or for carrying out a count or for obtaining a synchronization signal indicating the event (namely the avalanche of ions).

Figure 4:
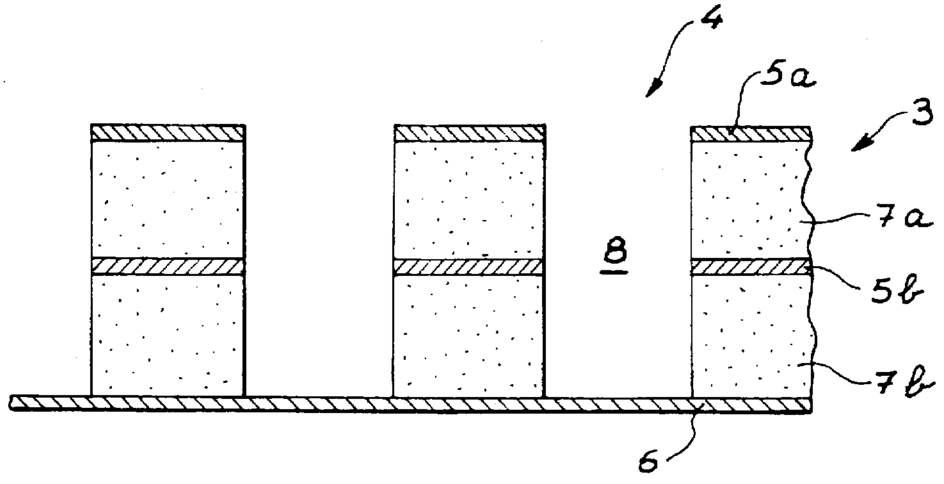
FIG. 4 shows in front view an array of microcounters in which several cathodes are superimposed.

FIG. 4 shows a strip 3 of microcounters produced according to an embodiment different from those described hereinbefore. In this embodiment, the strip 3 has two cathodes **5*a*, 5*b* and two layers 7*a*, 7*b* of photosensitive insulating materials, the insulating layer 7*a* being placed between the cathodes 5*a* and 5*b* and the layer 7*b* between cathode 5*b* and the common anode 6. In this case, the openings 8** are made through the entire thickness constituted by the cathodes and insulating layers.

Such an assembly with several cathode stages makes it possible to increase the height of the openings 8 and consequently the volume of the multiplication zone. The multiplication power of this zone is consequently increased and the collection of the ions created during the multiplication is facilitated and increased.

Figure 5:
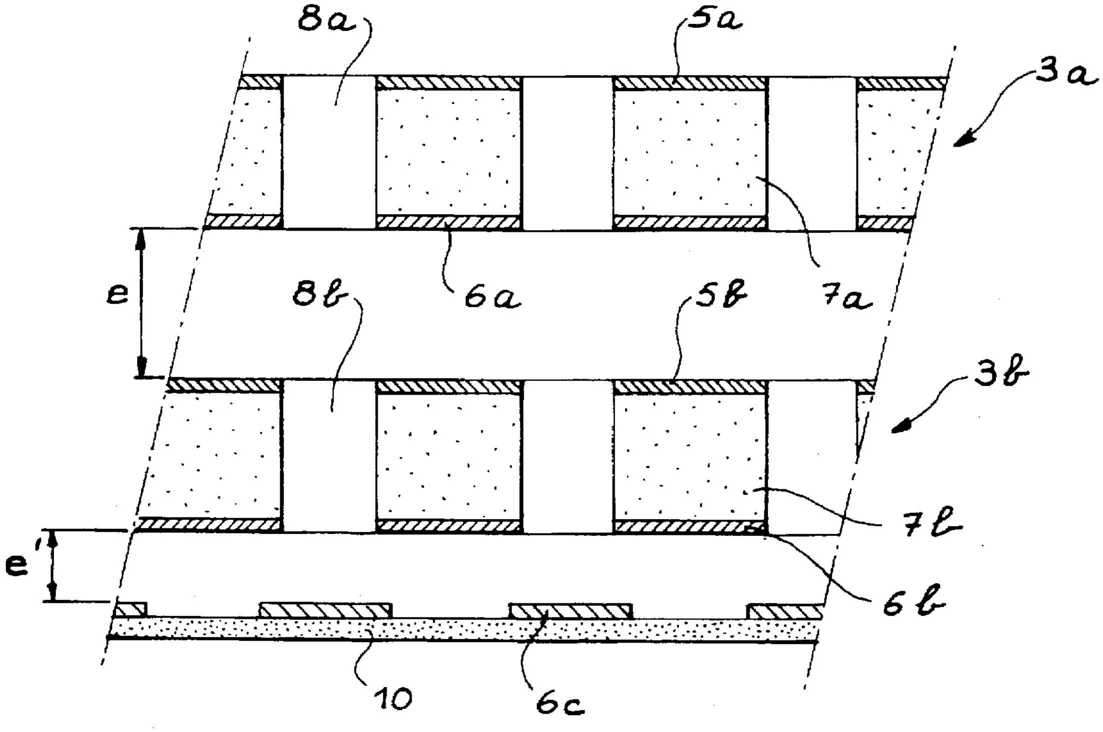
FIG. 5 is a front view of a counter in which several strips of microcounters are superimposed.

FIG. 5 shows a front view of a multistage counter produced by means of several superimposed microcounter plates *3a*, *3b*. In this embodiment, the microcounters are arranged in the form of strips substantially of the same type as shown in FIG. 1B. Each plate can either be placed directly on the lower plate or can be separated from its neighbour by gas identical to that in the activation zone (as is the case in this drawing) or by an insulating layer, The anode *6a*, *6b* of each of the plates *3a*, *3b* has an opening *8a*, *8b* aligned with the openings of the cathodes *5a*, *5b* and the insulating layers *7a*, *7b* and issuing onto a supplementary anode *6c*.

In this embodiment, supplementary anodes *6c* are necessary to create the electric field over the entire height of the ,openings and are placed beneath the clearance obtained by said openings *8a* and *8b*. The plates *3a*, *3b* and the supplementary anodes *6c* are deposited on a rigid substrate 10.

The electric field prevailing in said openings is quasiuniform over the entire height of the openings. Thus, although each cathode/anode space of a plate 3 has a lower multiplication power than a multiplication zone of the counter of FIG. 2A, the superimposing of several cathode/anode spaces makes it possible to obtain a gain, which is higher than in a single multiplication zone (like those shown in FIG. 2A). This sandwich configuration makes it possible to significantly reduce the electrical field in the insulant. It also enables the supplementary cathodes to collect part of the ions resulting from the multiplication. Thus, the counting rate of the detector is significantly increased.

It is pointed out that the gaps e and e' between the strips *3a* and *3b* and between the plate *3b* and the supplementary anode *6c* can be varied as a function of the desired results.

As explained hereinbefore, each microcounter 4 has its own multiplication zone 8. This means that each microcounter is independent. Nevertheless, in certain applications, the microcounters 4 can be interconnected, either by means of their cathode, or by means of their anode.

It is also possible to collect electric signals on the electrodes from above or below the multiplication zone 8, i.e. from the cathode 5 or anode 6, which facilitates connections.

FIG. 6 shows a microcounter plate or strip 3, whose microcounters 4 are connected by anodes 6 to external circuitry. More specifically, the plate 3 is bonded to a support 13 carrying the anodes 6 of the microcounters 4. Each anode 6 is connected by contact tracks P1, P2 to the external circuit, e.g. to an amplifier 15 located on a support 17. In this embodiment, the tracks P1 and P2 traverse the support 13. Moreover, as shown in FIG. 6, a power source 19 is connected to the plate 3 by the cathode 5.

According to another embodiment in which the anodes 6 are not interconnected, each of them can be directly connected to a separate amplifier. Each microcounter can then be considered as the pixel of a bidimensional or linear detector.

Thus, the interconnections between the anodes of the microcounters and the external circuits can easily be brought about by means of a multilayer circuit, e.g. of a ceramic material and in accordance with known procedures.

Therefore the invention has the advantage of facilitating connections, because this can take place either from the cathode side, or from the anode side, or from the back of the detector. Moreover, the connecting tracks between the microcounters and the amplifiers can be etched or screen printed during the manufacture of a proportional counter, so as to further facilitate connections.

In this form, each microcounter gives an electric signal, which is a function of the electron quantity received. This electric signal can be used for measuring the energy and the position of the impact. More specifically, the positioning of the impact of the ray (or space localization) can be obtained directly by identifying the affected microcounter, in the case where the absorption zone is weak. In the opposite case, the electrons resulting from the ionization are scattered over at least part of the proportional counter. It is then possible to investigate the centroid, i.e. the microcounter which has received the largest proportion of the scattered electrons. To investigate such a centroid among the affected microcounters, it is either possible to use a known logic method consisting of digitizing the signal derived by the affected microcounters and then calculating the corresponding centroid, or by an analog method sampling the electric signals on delay lines of type R.C, L.C or R. No matter which process is chosen for determining the localization of the events, it is necessary to process signals from the cathode, the signals from the anode and for certain embodiments using a supplementary anode, the signals from said supplementary anode.

FIG. 7 shows another embodiment of the invention, where several strips *3a*, *3b*, *3c*, *3d*, *3e* of microcounters are arranged so as to form a sequence of Us and inverted Us. These strips are of the type shown in FIG. 1B. This particular arrangement makes it possible to implement a delay line, such as can be used for localizing events. According to this embodiment, the different cathodes *5a–5e* are mutually perpendicularly juxtaposed. To each of these cathodes *5a–5e* corresponds an anode *6a–6e* separated from its corresponding cathode *5a–5e* by an insulating material layer *7a–7e*.

Figure 8:
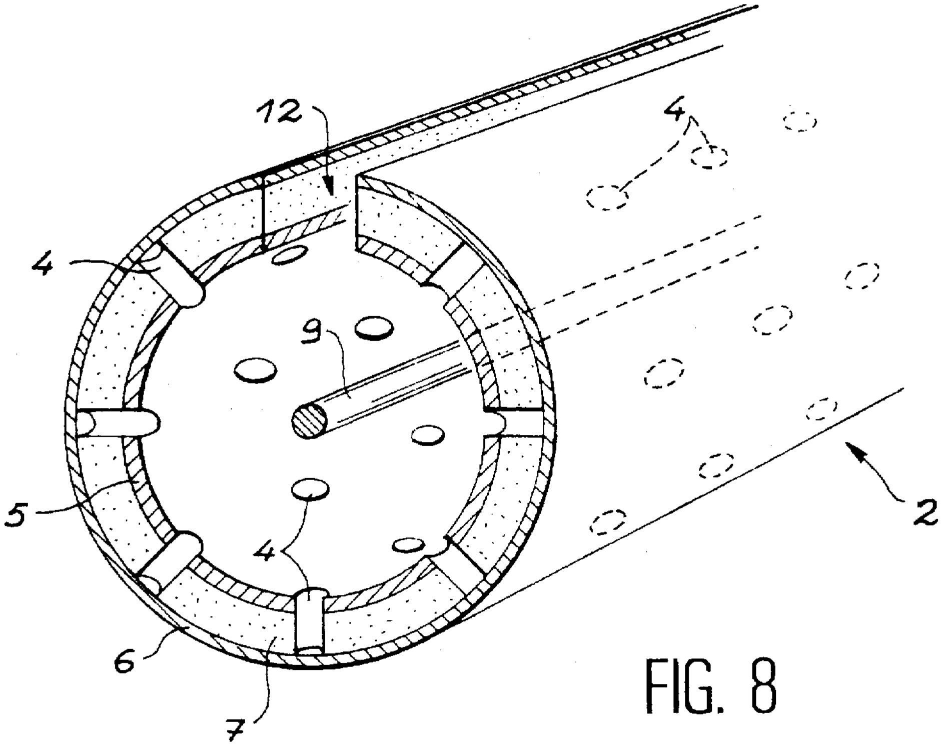
FIG. 8 shows an example of a cylindrical proportional counter.

FIG. 8 shows another embodiment of a proportional counter according to the invention. Unlike in the linear counters described in the preceding embodiments, said counter 2 is cylindrical. Such a cylindrical counter can e.g. be used in crystallography.

As can be seen in FIG. 6, the counter 2 is shaped like an open cylinder, whose opening 12 ensures the introduction of radiation into the cylinder. Thus, said counter 2 has a cathode plane 5 forming the inner wall of the cylinder and an anode plane 6 forming the outer wall of the cylinder. The anode 6 and cathode 5 are separated by a photosensitive, insulating material layer 7. With this cylinder shown in cross-section, openings 8 are visible on the cylinder section. Thus, the openings 8 are distributed over the entire cylinder length and are shown in dotted line form, because they are covered by the anode 6.

As can be seen in FIG. 8, an electric wire 9 longitudinally traverses the cylinder, said wire making it possible to supply a certain potential to the interior of the cylinder. For example, the cathode 5 could be raised to a zero potential, the anode 6 to a potential of +1000 V and the electric wire 9 to a potential of −200 V.

Thus, each microcounter array is implemented by means of an insulating material sheet covered on each of its faces with a conductive material. In accordance with embodiments, the insulant can be glass, photosensitive glass or any other plastics material having an adequate dielectric strength.

To produce each of the microcounters on a plate, it is necessary to make blind holes in the composite sheet (insulating sheet covered on either side with a conductive layer). Different known methods can be used for this. One of the methods consists of making reserves in the cathode by photolithography, followed by hollowing out, e.g. using chemical etching. The cathode then serves as a self-supported mask. The perforation of the insulating sheet takes place either by UV photolithography, or by deep X lithography, by chemical etching, ion etching, laser machining, etc., as a function of the nature of said insulating sheet. Another method consists of making blind holes directly using a laser able to pierce the cathode and insulant, but without piercing the anode. For this purpose the anode is made thicker than the cathode, or is made from a material of a suitable nature.

For certain embodiments, like that shown in FIG. 5, it is necessary to make issuing or through holes, i.e. holes which completely pass through the composite sheet. For this purpose it is possible to use either mechanical drilling, or laser drilling in much more simple manner than for the drilling of blind holes.

These technologies make it possible to produce counters at relatively low cost. These counters can be given considerable dimensions by juxtaposing several identical counters.

Another advantage of the invention is that, as the counter is mainly formed by the multiplication zone, it can be very thin, i.e. a few dozen microns. It is thus possible to obtain a proportional counter scarcely thicker than a sheet of paper. This makes it clear that detectors having very varied shapes can be designed, e.g. cylindrical, as shown in FIG. 6. With such cylindrical, spherical and similar geometries, the parallax generally created in an absorption zone is eliminated, so that a thick absorption zone can be obtained, which is about 100 mm.

Moreover, the multiplication zones have a geometry ensuring the absence of breakdown between the electrodes, even at the ends of the plates, because the electrodes, cathodes and anodes are not in the same plane. As the anodes have a simple and robust shape, they are not subject to deterioration under the effect of a possible breakdown or any electron and ion bombardment to which they are exposed.

All the proportional counter types shown in FIGS. 1A to 8 can be used in gas detectors for determining different radiation types, e.g. for X-ray detectors used in crystallography, it is possible to employ circular, linear or spherical proportional counters permitting very high counting rates. In this case, the counters are placed on goniometers, in front of X sources or in front of synchrotron radiation sources.

As these detectors have a very good energy resolution and a high gain, they make it possible to obtain a very good spatial resolution, whilst simplifying connections, because the anode and cathode planes can have, by screen process printing, all the necessary electrical paths to the external circuits.

Figure 9:
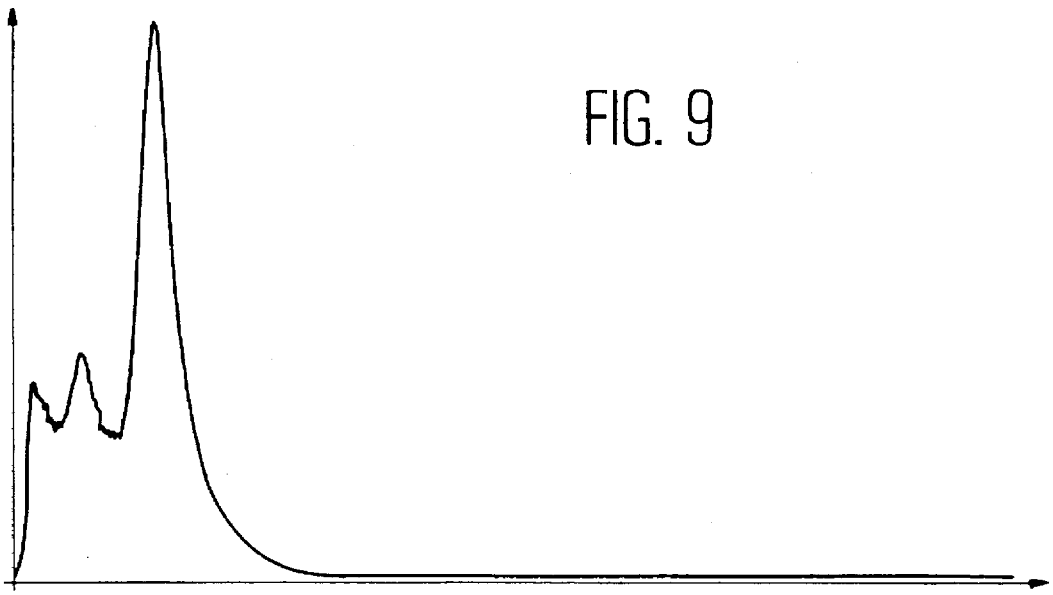
FIG. 9 shows a spectrum representing the measurement resolution of an energy of 6 Kev from an $Fe^{55}$ source using a gas detector according to the invention.

FIG. 9 shows a spectrum revealing the resolution of the measurements of the energy, for an energy of 6000 eV, in an argon/$CO_2$ mixture under atmospheric pressure. For the embodiments described hereinbefore, there is an energy resolution of about 20%, which shows that the counter effectively operates under proportional conditions.

For the counter types described hereinbefore, the multiplication gain obtained can be approximately 20,000, which ensures a correct processing of electric signals. For example, for a counter whose independent multiplication cells are separated by approximately 300 μm, the spatial resolution is approximately 50 μm. Such a proportional counter advantageously supports the high microcounter counting rates, which can be approximately 100,000 events per second.

As the counters according to the invention can have a high microcounter density, it is possible to work with very high flow rates.

Moreover, for counters in which each microcounter is independent, it is possible to obtain an even higher signal, so as to permit the detection of low flow rates, permitting Geiger counter operation.

Certain other advantages of the invention are that the thus formed detectors are compact and light with relatively low manufacturing costs compared with detectors produced using other technologies, so that their field of use can be considerably increased.

We claim:

1. An ionizing radiation detector comprising:

an enclosure filled with a gas having located therein a proportional counter and an absorption zone in which a gas is ionized by radiation;

wherein the proportional counter has at least one lower electrode and at least one upper electrode, which are parallel to one another and separated by an insulating material layer, the upper electrode and the insulating material layer having at least one opening, in which prevails a substantially uniform electric field and which constitutes a multiplication zone for electrons resulting from ionization of the gas by radiation.

2. The detector according to claim 1, wherein the lower electrode is an anode and the upper electrode is a cathode.

3. The detector according to claim 2, wherein the insulating material layer is rigid.

4. The detector according to claim 3, wherein the insulating material layer is either photosensitive, or highly resistive, or fluorescent.

5. The detector according to claim 2, wherein the insulating material layer is either photosensitive, or highly resistive, or fluorescent.

6. The detector according to claim 2, wherein the proportional counter has a plurality of superimposed upper electrodes parallel to the lower electrode and separated from one another by an insulating material layer, the opening of each upper electrode being aligned with the opening of each material layer juxtaposed with said upper electrode.

7. The detector according to claim 2, wherein the proportional counter incorporates a plurality of upper electrodes arranged in the same first plane, with the same first direction and interconnected and a plurality of lower electrodes arranged in the same second plane, parallel to the first plane, with the same second direction and interconnected.

8. The detector according to claim 2, wherein the proportional counter is cylindrical overall, the lower and upper electrodes forming an open cylinder, longitudinally traversed by an electric potential supply wire.

9. The detector according to claim 2, wherein the upper electrode and the lower electrode are independent and connected in each case to an input of an electronic processing circuit.

10. The detector according to claim 1, wherein the insulating material layer is rigid.

11. The detector according to claim 10, wherein the insulating material layer is either photosensitive, or highly resistive, or fluorescent.

12. The detector according to claim 10, wherein the proportional counter has a plurality of superimposed upper electrodes parallel to the lower electrode and separated from one another by an insulating material layer, the opening of each upper electrode being aligned with the opening of each material layer juxtaposed with said upper electrode.

13. The detector according to claim 10, wherein the proportional counter incorporates a plurality of upper electrodes arranged in the same first plane, with the same first direction and interconnected and a plurality of lower electrodes arranged in the same second plane, parallel to the first plane, with the same second direction and interconnected.

14. The detector according to claim 10, wherein the proportional counter is cylindrical overall, the lower and upper electrodes forming an open cylinder, longitudinally traversed by an electric potential supply wire.

15. The detector according to claim 10, wherein the upper electrode and the lower electrode are independent and connected in each case to an input of an electronic processing circuit.

16. The detector according to claim 1, wherein the insulating material layer is either photosensitive, or highly resistive, or fluorescent.

17. The detector according to claim 1, wherein the proportional counter has a plurality of superimposed upper electrodes parallel to the lower electrode and separated from one another by an insulating material layer, the opening of each upper electrode being aligned with the opening of each material layer juxtaposed with said upper electrode.

18. The detector according to claim 1, wherein the proportional counter incorporates a plurality of upper electrodes arranged in the same first plane, with the same first direction and interconnected and a plurality of lower electrodes arranged in the same second plane, parallel to the first plane, with the same second direction and interconnected.

19. The detector according to claim 1, wherein the proportional counter is cylindrical overall, the lower and upper electrodes forming an open cylinder, longitudinally traversed by an electric potential supply wire.

20. The detector according to claim 1, wherein the upper electrode and the lower electrode are independent and connected in each case to an input of an electronic processing circuit.

* * * * *